(12) United States Patent
Farjadrad

(10) Patent No.: US 10,778,404 B1
(45) Date of Patent: Sep. 15, 2020

(54) DUAL-DUPLEX LINK WITH ASYMMETRIC DATA RATE SELECTIVITY

(71) Applicant: Aquantia Corporation, San Jose, CA (US)

(72) Inventor: Ramin Farjadrad, Los Altos, CA (US)

(73) Assignee: Marvell Asia Pte., LTD, Singapore (SG)

( * ) Notice: Subject to any disclaimer, the term of this patent is extended or adjusted under 35 U.S.C. 154(b) by 0 days.

(21) Appl. No.: 15/478,051

(22) Filed: Apr. 3, 2017

Related U.S. Application Data

(60) Provisional application No. 62/317,493, filed on Apr. 1, 2016.

(51) Int. Cl.
| | | |
|---|---|---|
| *H03L 5/00* | (2006.01) | |
| *H04L 25/03* | (2006.01) | |
| *H04L 5/14* | (2006.01) | |
| *H04L 7/04* | (2006.01) | |
| *H04L 25/40* | (2006.01) | |

(52) U.S. Cl.
CPC .............. *H04L 5/1461* (2013.01); *H04L 7/04* (2013.01); *H04L 25/0384* (2013.01); *H04L 25/03853* (2013.01); *H04L 25/40* (2013.01)

(58) Field of Classification Search
CPC ..... H04L 5/1461; H04L 7/04; H04L 25/0384; H04L 25/03853; H04L 25/40
See application file for complete search history.

(56) References Cited

U.S. PATENT DOCUMENTS

| | | | |
|---|---|---|---|
| 6,772,351 B1 | 8/2004 | Werner | |
| 7,535,958 B2 | 5/2009 | Best | |
| 7,978,754 B2 | 7/2011 | Yeung | |
| 8,004,330 B1* | 8/2011 | Acimovic | ........ H03K 19/00361 327/108 |
| 8,483,579 B2* | 7/2013 | Fukuda | ................ H03D 13/003 327/12 |
| 8,948,203 B1* | 2/2015 | Nolan | ................... H04L 5/1446 370/400 |
| 9,294,313 B2 | 3/2016 | Prokop | |
| 9,432,298 B1 | 8/2016 | Smith | |
| 2005/0089126 A1 | 4/2005 | Zerbe | |
| 2006/0170453 A1 | 8/2006 | Zerbe | |
| 2007/0281643 A1 | 12/2007 | Kawai | |
| 2008/0310491 A1 | 12/2008 | Abbasfar | |
| 2009/0304054 A1 | 12/2009 | Tonietto | |
| 2011/0038286 A1 | 2/2011 | Ta | |
| 2012/0216084 A1 | 8/2012 | Chun | |
| 2013/0222026 A1 | 8/2013 | Havens | |
| 2014/0126613 A1 | 5/2014 | Zhang | |
| 2014/0269860 A1 | 9/2014 | Brown | |
| 2015/0012677 A1 | 1/2015 | Nagarajan | |
| 2015/0146766 A1 | 5/2015 | Longo | |
| 2015/0180760 A1 | 6/2015 | Rickard | |
| 2016/0217872 A1 | 7/2016 | Hossain | |

* cited by examiner

*Primary Examiner* — Yemane Mesfin
*Assistant Examiner* — Henry Baron

(57) ABSTRACT

A Serializer/Deserializer (SERDES) circuit is disclosed. The circuit includes an input/output (I/O) pad for coupling to a dual duplex SerDes link. A transmit circuit is coupled to the I/O pad, and includes transmit rate selection circuitry to select between data transmission at a full rate or a sub-rate. A receive circuit is coupled to the I/O pad, and includes receive rate selection circuitry to select between data receipt at the full rate or the sub-rate. Data transmitted by the transmit circuit is at a data rate different than data received by the receive circuit.

20 Claims, 4 Drawing Sheets

DUAL-DUPLEX LINK WITH ASYMMETRIC DATA RATE SELECTIVITY

CROSS-REFERENCE TO RELATED APPLICATIONS/TECHNICAL FIELD

This application is a Nonprovisional application that claims priority to U.S. Application Ser. No. 62/317,493, filed Apr. 1, 2016. The disclosure herein relates to communications systems, and more specifically to high-speed signaling systems and methods.

BACKGROUND

Serializer/Deserializer (SerDes) links are widely used in various high-speed communications applications. The links generally provide for converting parallel data into serial form for high-speed data transfers across a minimum number of electrical paths. FIG. 1 illustrates several applications for SerDes links, such as board-to-board links 102, chip-to-chip links 104, backplane links 106, and box-to-box links 108, to name a few.

One particular form of SerDes link involves a dual-duplex architecture, shown generally in FIG. 2, that employs dual links 202 and 204 that both operate to transmit and receive data bidirectionally. While this architecture works well for its intended applications, in some situations, a transmit data rate may be different than a receive data rate for the same link. What is needed is a power-efficient method and apparatus to support asymmetric operations for dual-duplex SerDes links.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of apparatus and methods for SerDes links are disclosed. In one embodiment, a Serializer/Deserializer (SERDES) circuit is disclosed. The circuit includes an input/output (I/O) pad for coupling to a duplex SerDes link. A transmit circuit is coupled to the I/O pad, and includes transmit rate selection circuitry to select between data transmission at a full rate or a sub-rate. A receive circuit is coupled to the I/O pad, and includes receive rate selection circuitry to select between data receipt at the full rate or the sub-rate. Data transmitted by the transmit circuit is at a data rate different than data received by the receive circuit.

In a further embodiment, a method of operation in a Serializer/Deserializer (SERDES) circuit is disclosed. The method includes selecting between data transmission for a transmit circuit at a full rate or a sub-rate; and selecting between data reception for a receive circuit at a full rate or a sub-rate. Data transmitted by the transmit circuit is at a data rate different than data received by the receive circuit.

In yet another embodiment, a Serializer/Deserializer (SERDES) link is disclosed. The link includes a signaling channel and a first SERDES circuit coupled to a first end of the signaling channel. A second SERDES circuit is coupled to a second end of the signaling channel to communicate with the first SERDES circuit. The second SERDES circuit includes a transmit circuit coupled to the signaling channel. The transmit circuit includes transmit rate selection circuitry to select between data transmission at a full rate or a sub-rate. A receive circuit is coupled to the signaling channel and includes receive rate selection circuitry to select between data receipt at the full rate or the sub-rate. Data transmitted by the transmit circuit is at a data rate different than data received by the receive circuit.

Figure 1:
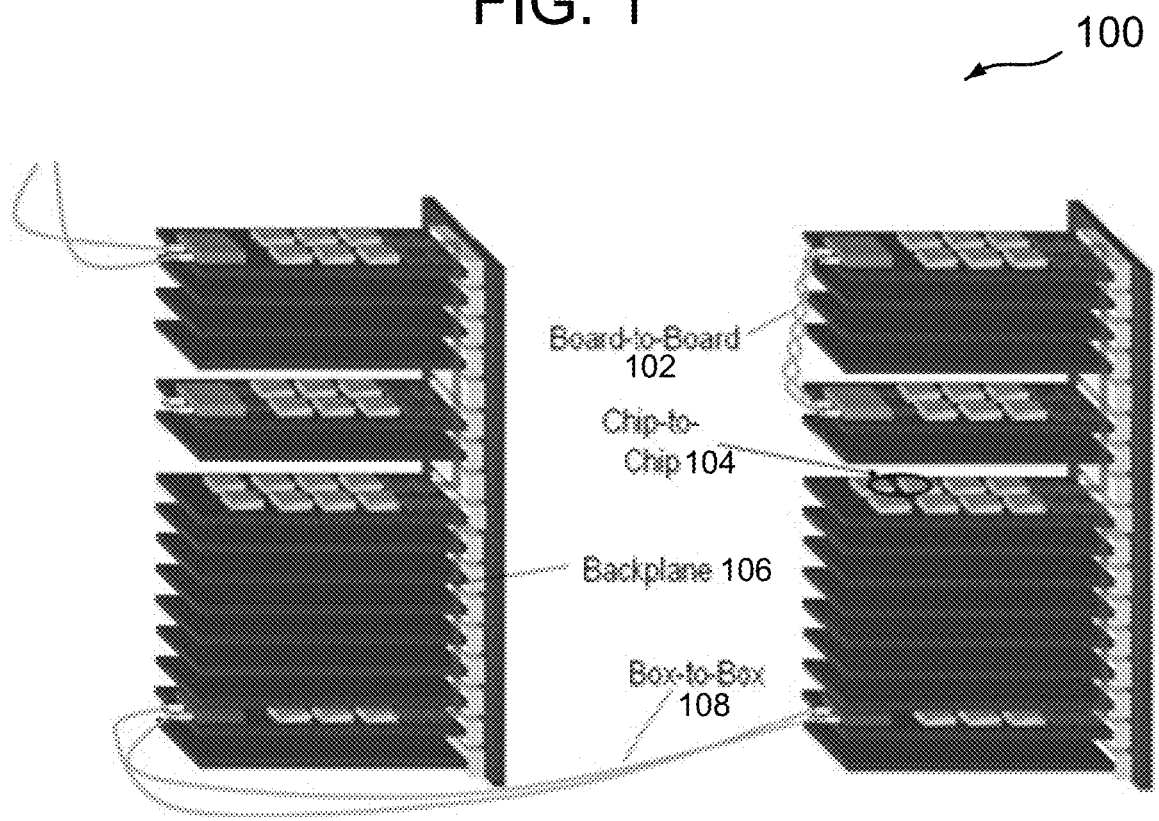
FIG. 1 illustrates two computer servers with various SerDes links.
Figure 2:
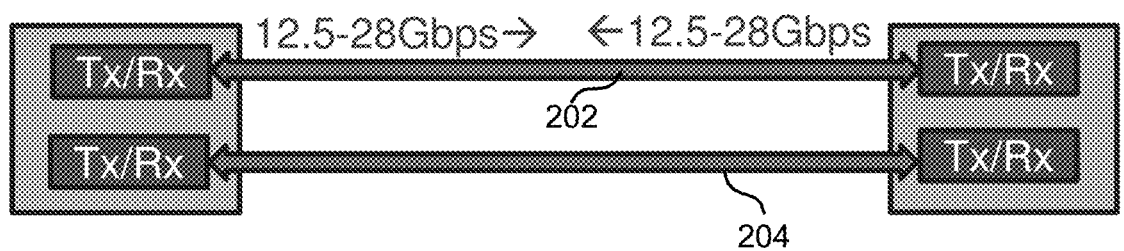
FIG. 2 illustrates one embodiment of a dual-duplex SerDes link.
Figure 3:
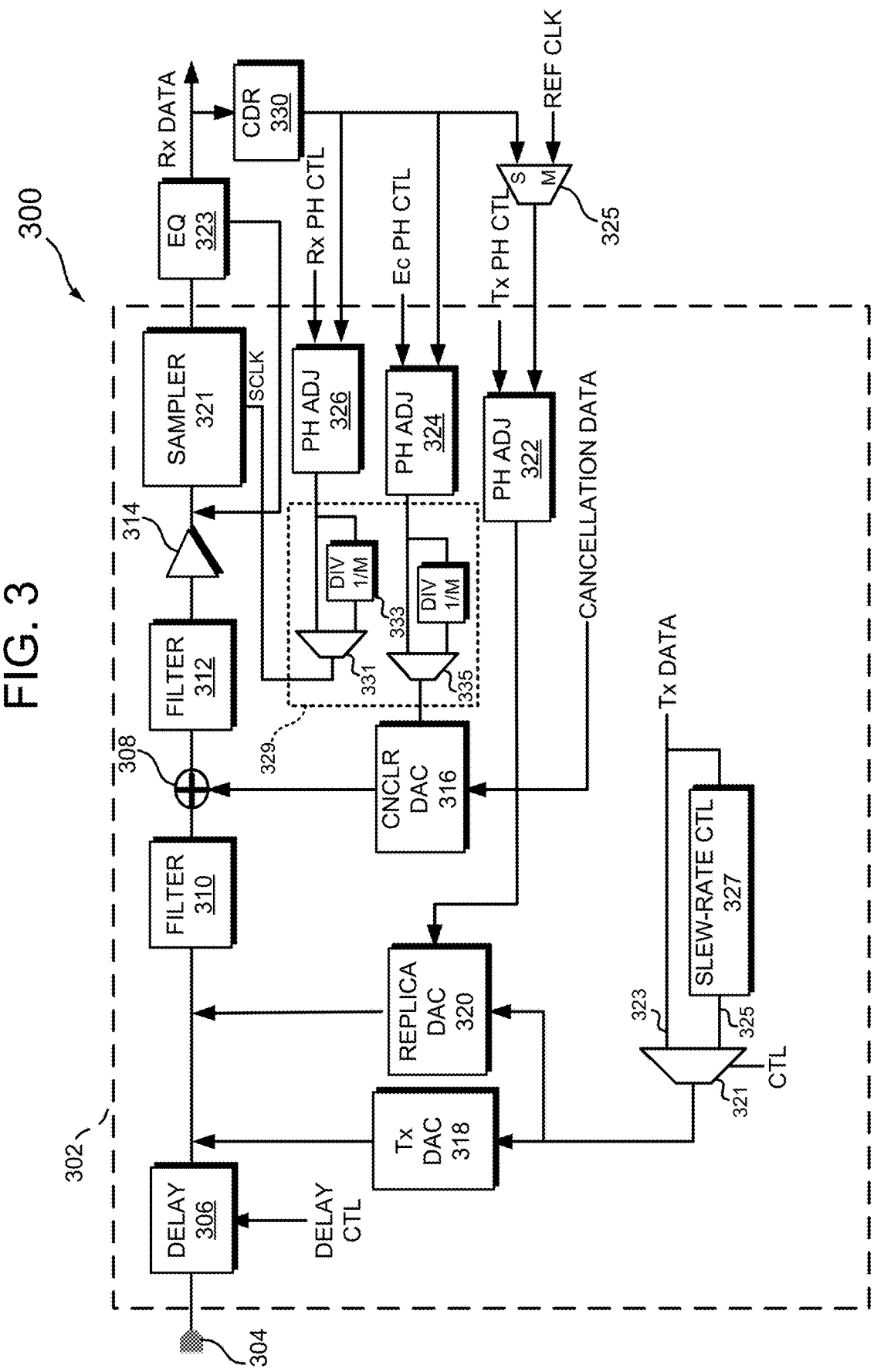
FIG. 3 illustrates a block diagram of one embodiment of a SerDes input/output (I/O) circuit architecture.

FIG. 3 illustrates a block diagram of one embodiment of a Serializer/Deserializer (SerDes) input/output (I/O) circuit architecture, generally designated 300, that provides for asymmetric transmit and receive data rates with respect to a reference clock. The architecture includes analog signal processing circuitry 302 coupled to an input/output (I/O) pad 304. The analog signal processing circuitry 302 includes an adjustable delay line 306, summing circuitry 308, a first filter such as an aliasing filter 310, a second filter such as a boost filter 312 and a programmable gain amplifier (PGA) 314. The adjustable delay line 306 may be used to adjust a relative phase offset between a receive signal phase and a local transmit transition phase by a phase value $\Phi$, as described in U.S. patent application Ser. No. 15/478,046, titled: "DUAL-DUPLEX LINK WITH INDEPENDENT TRANSMIT AND RECEIVE PHASE ADJUSTMENT", assigned to the Assignee of the instant application, and expressly incorporated herein by reference in its entirety. The summing circuitry 308 generally receives compensation signals from an interference canceller digital-to-analog converter (DAC) 316, and aliasing filter 310.

Transmit circuitry in the architecture 300 provides transmit data to the link via pin 304 at a selectable full (or default) data rate or sub-data rate. The transmit circuitry generally includes transmit control circuitry that feeds selected full-rate or sub-rate data to a transmit DAC 318, and a pre-echo canceller 320. The pre-echo canceller 320 may be configured as a replica DAC to compensate for the transmit signal generated by the transmit DAC 318.

Further referring to FIG. 3, the transmit control circuitry includes a slew-rate controller 327 that feeds a first selector circuit 321. The selector circuit 321 provides selectivity in choosing between full-rate transmit data Tx-DATA or sub-rate transmit data generated by the slew-rate controller 327. The selector circuit 321 may be in the form of a multiplexer that receives the full-rate transmit data Tx-DATA on a first input, at 323, and sub-rate transmit data on a second input 325. A control signal CTL specifies which data to pass to the DACs 318 and 320. The slew rate controller 327 upsamples the full-rate transmit data Tx-DATA by a programmable factor N that defines a ratio between the full-rate and the desired sub-rate of the transmit data on the link.

Figure 4:
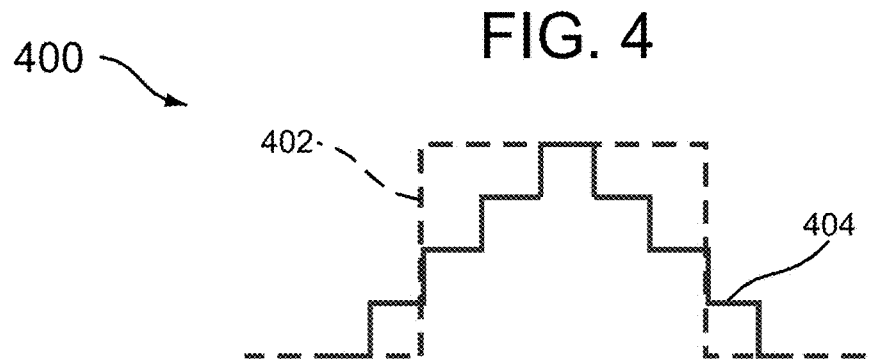
FIG. 4 illustrates a transmit waveform generated by the slew rate control circuitry of FIG. 3.

FIG. 4 illustrates a waveform processed by the slew rate controller 327, which generally performs each transmit transition, such as at 402, in N steps in time, such as at 404. As a result, residual transmit transmission magnitude and echo magnitude at the receiver sampling point may be attenuated by a factor corresponding to N. In some embodiments, the slew rate controller may be implemented in the analog domain using a continuous time filter after the transmit DAC driver 318.

Referring back to FIG. 3, receiver circuitry in the architecture 300 includes a sampler 321 that receives an output signal of the PGA 314 and samples the output signal in response to a sampling clock signal SCLK. In one embodiment, multiple phase adjustment circuits 322, 324, and 326 provide separate phase shifts for respective clock signals selected by multiplexers 333, 335 and 331. In particular, multiplexer 333 selects from either a reference clock (in the case where the circuit is configured as a "master") or a clock signal generated from a clock and data recovery (CDR) circuit 330 (in the case where the circuit is configured as a "slave"). For one specific embodiment, the architecture employs phase delay circuit components similar to embodiments disclosed in U.S. patent application Ser. No. 15/478,046, previously identified above.

With continued reference to FIG. 3, the receiver circuit includes receiver sub-rate selection circuitry 329 that includes a second selector circuit 331. The second selector circuit 331 provides selectivity in choosing between a full-rate clock signal or a sub-rate clock signal generated by, for example, a divider circuit 333. The divider circuit reduces the clock rate by a factor of M, which may be selectively fed to the sampler as the sampling clock SCLK. An equalizer 323 may then apply equalization to the received signal, sampled by the sampler 321 at a rate dictated by the sampling clock SCLK, resulting in receive data Rx-DATA. A third selector circuit 335 provides a similarly selectable clock signal to the interference canceller DAC 316.

As noted above, in some situations, the respective opposite ends of a given SerDes link may be identified as master and slave devices. A "master" configuration utilizes a reference clock for data transmit and receive purposes. A "slave" configuration receives and recovers the reference clock from the master, and uses the same clock to transmit data back to the master.

Figure 5A:
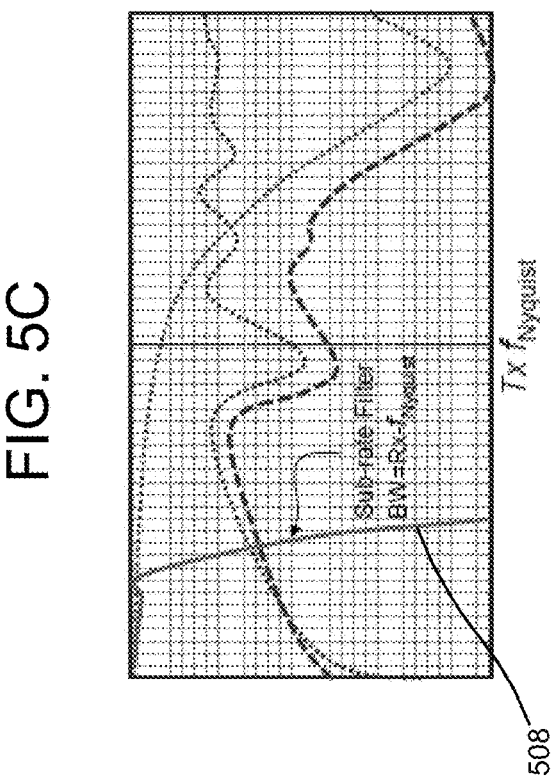
FIG. 5A illustrates a channel response curve in the frequency domain for a link having a transmitter operating at a full data rate, a receiver operating at a sub-rate, and a resulting echo channel curve.
Figure 5B:
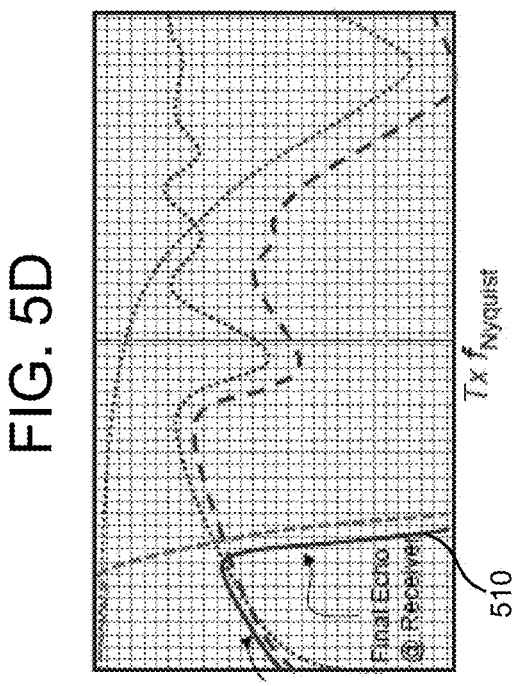
FIG. 5B illustrates a channel response curve similar to FIG. 5A, with an additional echo signal curve.
Figure 5C:
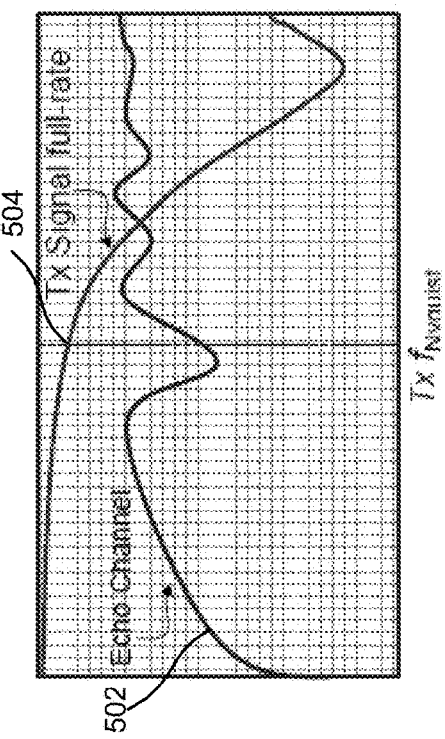
FIG. 5C illustrates a channel response curve similar to FIGS. 5A and 5B, with the inclusion of a filter boundary due to a receiver-side sub-rate filter.
Figure 5D:
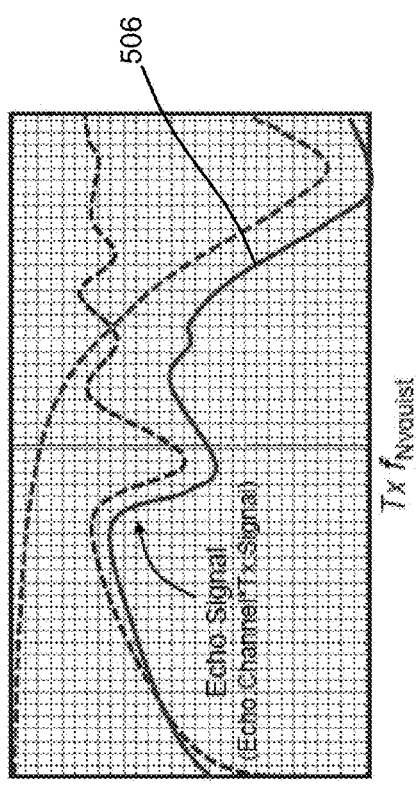
FIG. 5D illustrates a channel response curve similar to FIGS. 5A, 5B, and 5C, showing a final echo signal at a receiver as attenuated by the filter shown in FIG. 5C.

In operation, a given link may operate in different directions at different data rates. For one example, a given SerDes transceiver may transmit data at a different rate than it receives data. FIG. 5A illustrates a graph, in the frequency domain, showing an echo channel frequency response curve 502 with respect to a full-rate transmit signal 504. A resulting echo signal is shown in FIG. 5B, at 506, illustrating how the echo signal closely correlates with the transmit signal. However, by configuring the receiver interference filter bandwidth at a sub-rate of 1/M, shown at 508 in FIG. 5C, a resulting echo signal 510 shown in FIG. 5D, may be realized. The resulting echo signal is significantly attenuated well below the Nyquist frequency.

In some situations, the sub-rate factor M may be much larger than 1. The anti-aliasing filter bandwidth may then be much lower than the transmit signal Nyquist bandwidth, and thus filters most of the echo power that is at high frequency. In such a circumstance, many of the circuit components shown in FIG. 3, such as the delay line 306 and interference canceller 316 may be disabled in a low-power mode to save power, or eliminated altogether for fixed applications.

Figure 6A:
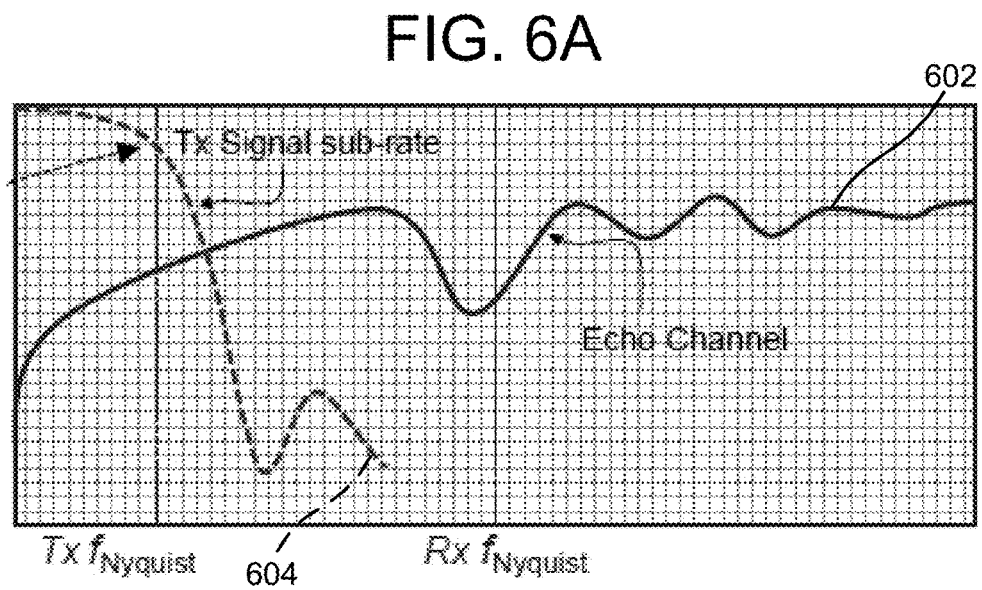
FIG. 6A illustrates a channel response curve in the frequency domain for a link having a receiver operating at a full data rate, a transmitter operating at a sub-rate, and a resulting echo channel curve.
Figure 6B:
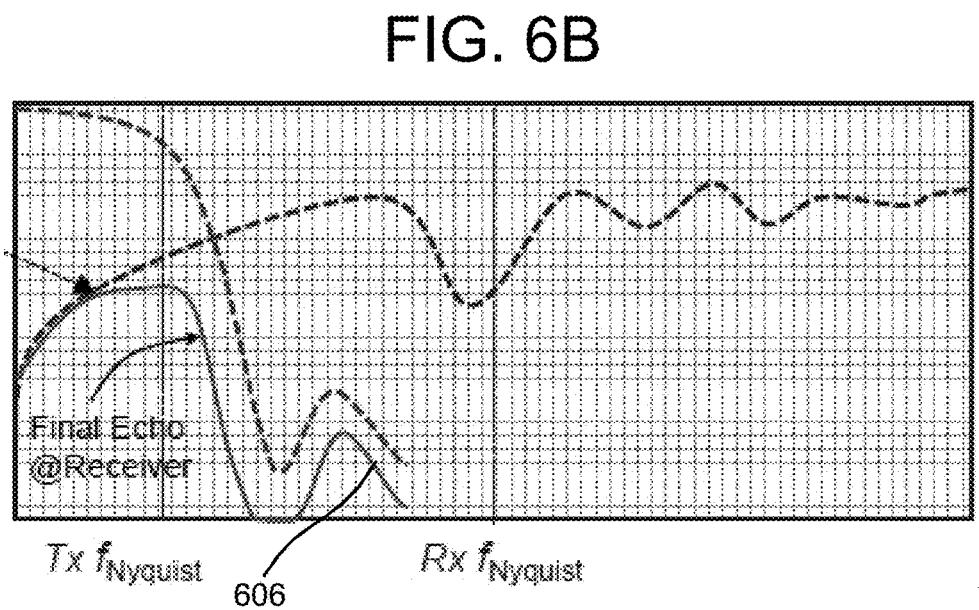
FIG. 6B illustrates a channel response curve similar to FIG. 6A, showing a final echo curve as seen by the receiver due to use of a slew-rate control circuit.

As another example, a given SerDes transceiver may transmit data at a sub-rate, while it receives data at a full rate. FIG. 6A illustrates a graph, in the frequency domain, showing an echo channel frequency response curve 602 with respect to a full-rate receive signal, and a sub-rate transmit signal 604. A resulting echo signal is shown in FIG. 6B, at 606, illustrating how the final echo signal may be significantly attenuated by employing the slew rate control circuit with a factor of N.

In some situations, the sub-rate factor N may be much larger than 1. The slew rate control upsampler may perform each transmit transition in N steps in time. In doing so, residual transmit transition and echo magnitudes at the receiver sampling point may be attenuated by a corresponding factor of N. Consequently, many of the circuit components shown in FIG. 3, such as the delay line 306 and interference canceller 316 may be disabled to save power, or eliminated altogether for fixed applications. Additionally, echo cancellation may be performed in the digital domain rather than the analog domain to eliminate the need for a canceller DAC.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. A Serializer/Deserializer (SERDES) transceiver comprising:
    an input/output (I/O) pad for coupling to a simultaneously bidirectional SerDes signaling path;
    a transmit circuit coupled to the I/O pad to drive first data across the signaling path via the I/O pad, the transmit circuit including transmit data rate selection circuitry to select between data transmission at a full data rate or a sub-rate data rate, the sub-rate data rate less than the full data rate and based on sub-rate data signals in the form of stair-stepped pulses;
    a receive circuit coupled to the I/O pad to receive second data from the signaling path via the I/O pad simultaneously with the transmission of the first data, the receive circuit including receive data rate selection circuitry to select between data receipt at the full data rate or the sub-rate data rate; and
    wherein data transmitted by the transmit circuit is at a data rate different than data received by the receive circuit.

2. The SERDES transceiver according to claim 1, wherein the transmit rate selection circuitry includes a selector to select between a full rate transmit data signal and a sub-rate transmit data signal generated by a slew rate control circuit to generate the stair-stepped pulses.

3. The SERDES transceiver according to claim 2, wherein the sub-rate data rate corresponds to 1/N the full data rate, and the slew rate control circuit generates N steps within a given pulse at the sub-rate data rate.

4. The SERDES transceiver according to claim 3, further comprising a selectively enabled delay circuit, the delay circuit selectively enabled based on the value of N.

5. The SERDES transceiver according to claim 1, wherein the receive rate selection circuit includes a selector to select between a full rate receive clock and a frequency-divided receive clock.

6. The SERDES transceiver according to claim 1, wherein the SERDES transceiver is configured as a slave device to communicate with a master device, and wherein data transmit and receive operations are synchronized with a timing signal generated by the master device.

7. The SERDES transceiver according to claim 1, wherein the SERDES transceiver is configured as a master device to communicate with a slave device, and wherein data transmit and receive operations are synchronized with a timing signal generated by the master device.

8. A method of operation in a Serializer/Deserializer (SERDES) transceiver, the method comprising:
    selecting between data transmission for a transmit circuit at a full data rate or a sub-rate data rate, the sub-rate data rate less than the full data rate;
    selecting between data reception for a receive circuit at the full data rate or the sub-rate data rate, wherein selecting the sub-rate data rate includes receiving data signals in the form of stair-stepped pulses based on the sub-rate data rate; and
    wherein data transmitted by the transmit circuit is at a transmit data rate different than data received at a receive data rate by the receive circuit.

9. The method according to claim 8, further comprising:
    selecting data transmission at the sub-rate data rate; and
    controlling a slew rate of the data signals based on the sub-rate data rate.

10. The method according to claim 9, wherein controlling the slew rate comprises:
    generating the stair-stepped pulses based on the sub-rate data rate.

11. The method according to claim 10, wherein the sub-rate data rate corresponds to 1/N the full data rate, and the generating comprises generating N steps within a given pulse at the sub-rate data rate.

12. The method according to claim 11, further comprising:
    selectively enabling a delay circuit based on a value of N.

13. The method according to claim 8, further comprising:
    selecting data reception at the sub-rate data rate; and
    dividing a frequency of a receive clock based on the sub-rate data rate.

14. The method according to claim 8, further comprising:
    configuring the SERDES circuit as a slave device for communicating with a master device; and
    synchronizing data transmit and receive operations with a timing signal generated by the master device.

15. The method according to claim 8, further comprising:
    configuring the SERDES circuit as a master device for communicating with a slave device;
    generating a timing signal on the master device; and
    synchronizing data transmit and receive operations on the master device and the slave device with the timing signal.

16. A Serializer/Deserializer (SERDES) link comprising:
    a simultaneously bidirectional signaling channel;
    a first SERDES transceiver coupled to a first end of the simultaneously bidirectional signaling channel; and a second SERDES transceiver coupled to a second end of the simultaneously bidirectional signaling channel to communicate with the first SERDES transceiver;

wherein the second SERDES transceiver includes
- a transmit circuit coupled to the signaling channel to transmit first data, the transmit circuit including transmit rate selection circuitry to select between data transmission at a full data rate or a sub-rate data rate, the sub-rate data rate less than the full data rate and based on sub-rate data signals in the form of stair-stepped pulses;
- a receive circuit coupled to the signaling channel to receive second data simultaneous with transmission of the first data, the receive circuit including receive rate selection circuitry to select between data receipt at the full data rate or the sub-rate data rate; and wherein data transmitted by the transmit circuit is at a data rate different than data received by the receive circuit.

17. The SERDES link according to claim 16, wherein:
the first SERDES transceiver is configured as a slave device;
the second SERDES transceiver is configured as a master device; and
wherein data transmit and receive operations for both the master device and the slave device are synchronized to a timing signal generated by the master device.

18. The SERDES link according to claim 16, wherein the transmit rate selection circuitry includes a selector to select between a full rate transmit data signal and a sub-rate transmit data signal generated by a slew rate control circuit to generate the stair-stepped pulses.

19. The SERDES link according to claim 18, wherein the sub-rate data rate corresponds to 1/N the full data rate, and the slew rate control circuit generates N steps within a given pulse at the sub-rate data rate.

20. The SERDES link according to claim 19, wherein the receive rate selection circuit includes a selector to select between a full rate receive clock and a frequency-divided receive clock.

* * * * *